E. Gordon,
Photographic Plate-Holder.
Nº 21,829. Patented Oct. 19, 1858.
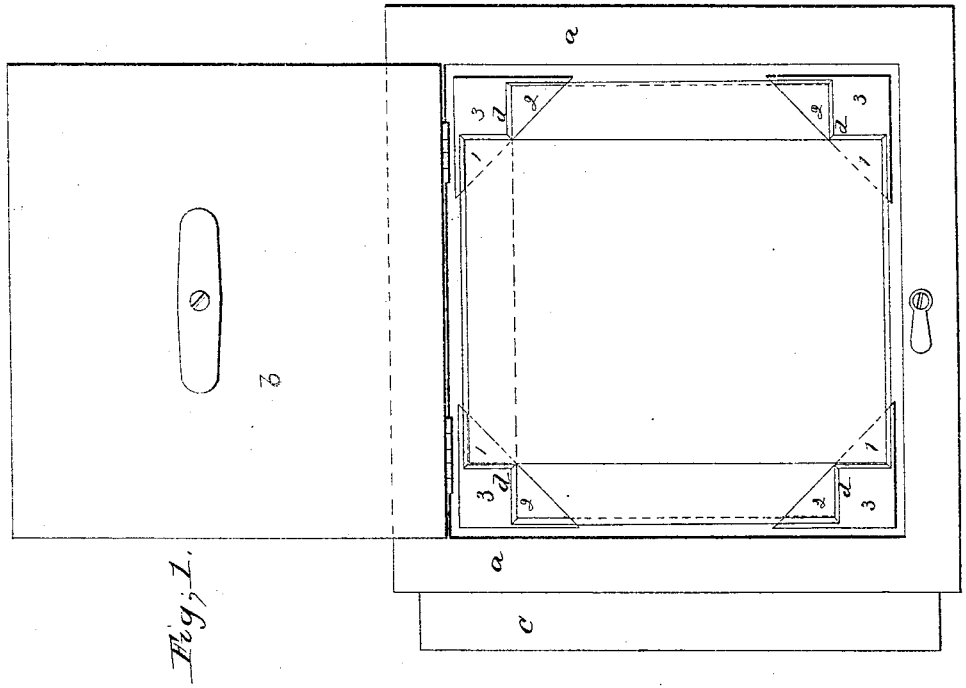
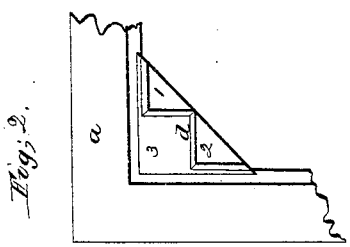
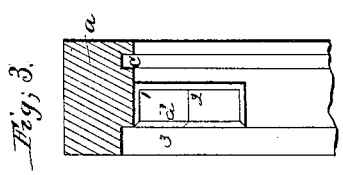
Witnesses;
Lemuel W. Serrell
Thomas G. Harold
Inventor,
E. Gordon

UNITED STATES PATENT OFFICE.

EBENEZER GORDON, OF NEW YORK, N. Y.

PHOTOGRAPHIC SHIELD.

Specification of Letters Patent No. 21,829, dated October 19, 1858.

*To all whom it may concern:*

Be it known that I, EBENEZER GORDON, of the city and State of New York, have invented, made, and applied to use a certain new and useful Improvement in Frames or Shields for Photographic Cameras; and I do hereby declare that the following is a full, clear, and exact description of the construction and operation of the same, reference being had to the annexed drawings, making part of this specification, wherein—

Figure 1, is a view of the frame or shield with the back open, to show my improvements. Fig. 2, is a view of one corner and Fig. 3, is a section through the frame representing one of my improved corner pieces in place.

Similar marks of reference denote the same parts.

In taking landscape views, groups and similar pictures the plate is used in a horizontal position, while in taking likenesses of one person and similar views the longest side of the plate receiving the same stands vertical in the camera. To accommodate these two positions in taking photographic and similar pictures separate frames have been constructed to receive and shield the plate while being conveyed to and from the camera, or else the camera has to be turned upon its side, greatly to the inconvenience of the operator, and the loss of time in adapting the plate and camera to take the particular picture.

My said invention obviates all the foregoing inconveniences and consists in what may be termed a "turn shield," the same being a frame $a$, adapted to the camera, with the back $b$, and slide $c$, in the usual manner.
The interior of this frame forms a square opening, of a little more than the longest length of the plate to be used therein.

$d\ d$, are my improved corners that are formed of suitable material, and each corner piece has two recesses for receiving the glass or other plate, the recesses 1, 1, sustaining the same when the longest sides of the plate are vertical, and the recesses 2, 2, receiving the plate when in position for a landscape or similar picture. Between the recesses 1, and 2 in each corner there is therefore a square block or support 3 measuring along its side one half the difference between the vertical and horizontal sides of the glass or other plate, which with the present sizes of plates will be ½ an inch, one inch, or one and a half inches for the square of the said block (3). The frames carrying smaller sizes of plates adapted to the main frame or shield in the usual manner, can be placed into the corners aforesaid in either a vertical or horizontal position and the plate will occupy a corresponding position within said frames.

Having thus described the nature of my said invention what I claim as new and desire to secure by Letters Patent is—

The corners $d,\ d$, formed with two recesses and applied at the angles of a square frame to receive the photographic plate or its equivalent, in a horizontal or vertical position as set forth.

In witness whereof I have hereunto set my signature this twenty fifth day of September 1858.

E. GORDON.

Witnesses:
  LEMUEL W. SERRELL,
  THOMAS G. HAROLD.